(No Model.) 7 Sheets—Sheet 1.
T. E. MONTAGUE.
MACHINE FOR BENDING CARRIAGE THILLS.
No. 356,952. Patented Feb. 1, 1887.

(No Model.) 7 Sheets—Sheet 2.

T. E. MONTAGUE.
MACHINE FOR BENDING CARRIAGE THILLS.

No. 356,952. Patented Feb. 1, 1887.

WITNESSES:

INVENTOR:
T. E. Montague
BY Munn & Co.
ATTORNEYS.

(No Model.)  7 Sheets—Sheet 3.

T. E. MONTAGUE.
MACHINE FOR BENDING CARRIAGE THILLS.

No. 356,952. Patented Feb. 1, 1887.

WITNESSES:

INVENTOR:
T. E. Montague
BY Munn & Co.
ATTORNEYS.

(No Model.)  
7 Sheets—Sheet 4.

T. E. MONTAGUE.
MACHINE FOR BENDING CARRIAGE THILLS.

No. 356,952. Patented Feb. 1, 1887.

Fig. 4.

WITNESSES:

INVENTOR:
T. E. Montague
BY Munn & Co.
ATTORNEYS.

(No Model.) 7 Sheets—Sheet 5.
T. E. MONTAGUE.
MACHINE FOR BENDING CARRIAGE THILLS.
No. 356,952. Patented Feb. 1, 1887.
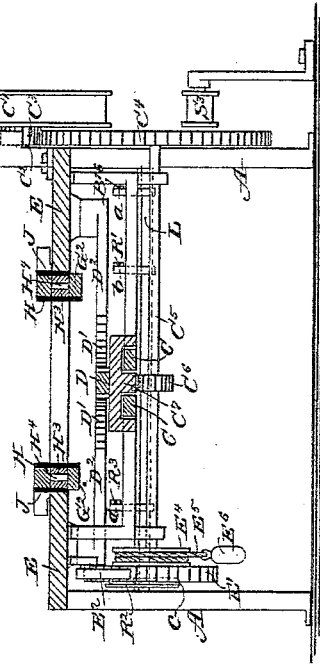
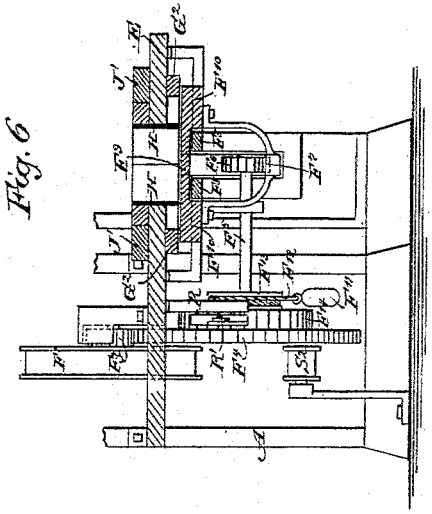
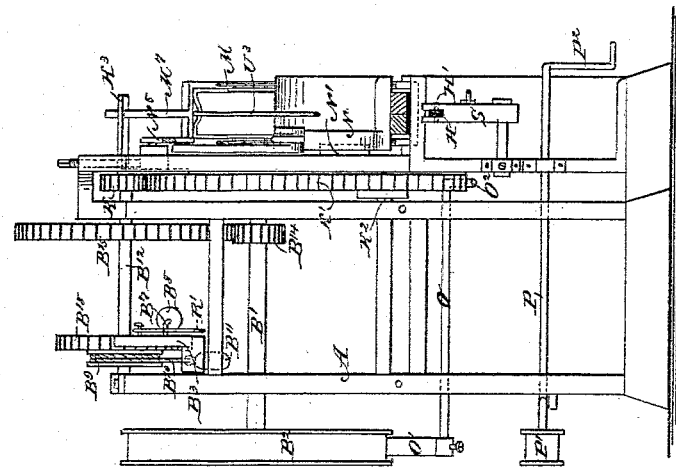
WITNESSES:
INVENTOR:
T. E. Montague
BY Munn & C.
ATTORNEYS.

(No Model.) 7 Sheets—Sheet 6.
T. E. MONTAGUE.
MACHINE FOR BENDING CARRIAGE THILLS.
No. 356,952. Patented Feb. 1, 1887.
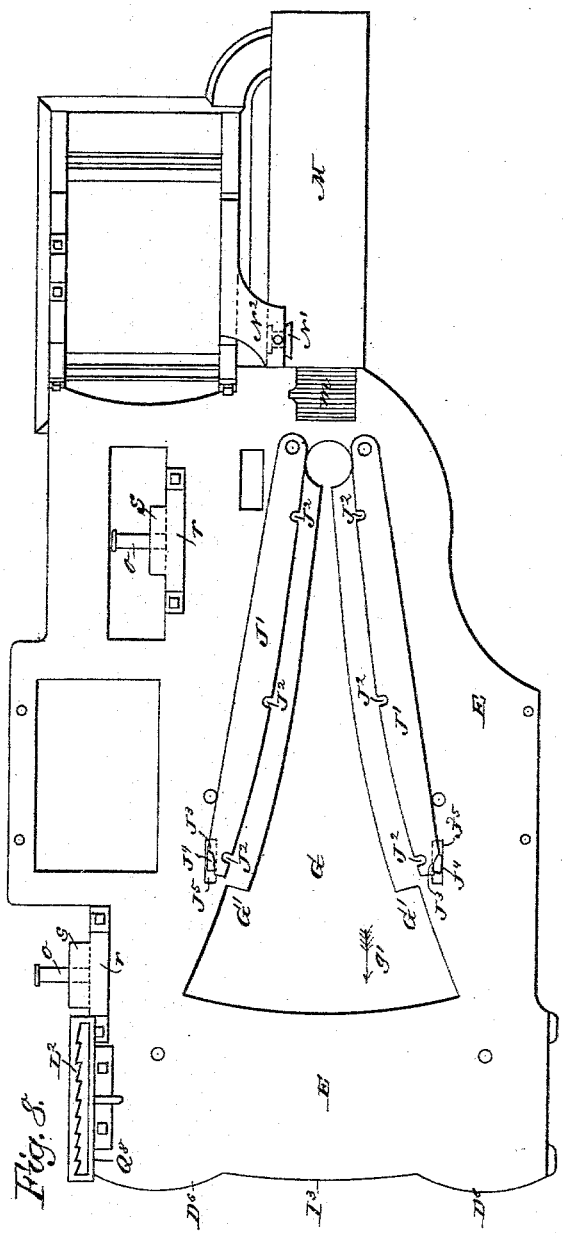
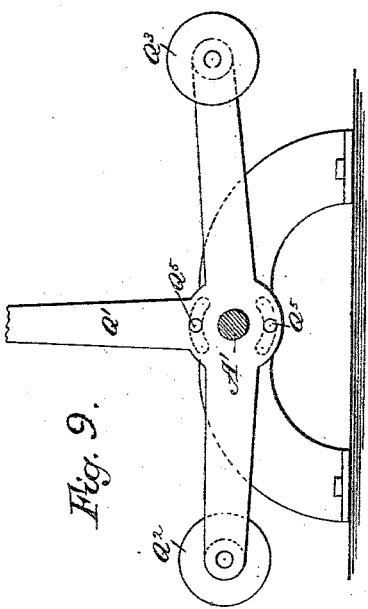
WITNESSES:
INVENTOR:
T. E. Montague
BY Munn & Co.
ATTORNEYS.

(No Model.) 7 Sheets—Sheet 7.

T. E. MONTAGUE.
MACHINE FOR BENDING CARRIAGE THILLS.

No. 356,952. Patented Feb. 1, 1887.

WITNESSES:
Otto Meyer
C. Sedgwick

INVENTOR:
T. E. Montague
BY Munn & Co.
ATTORNEYS.

UNITED STATES PATENT OFFICE.

THOMAS E. MONTAGUE, OF WEST LORNE, ONTARIO, CANADA.

MACHINE FOR BENDING CARRIAGE-THILLS.

SPECIFICATION forming part of Letters Patent No. 356,952, dated February 1, 1887.

Application filed April 3, 1886. Serial No. 197,605. (No model.)

*To all whom it may concern:*

Be it known that I, THOMAS E. MONTAGUE, of West Lorne, in the Province of Ontario and Dominion of Canada, have invented a new and Improved Shaft-Bending Machine, of which the following is a full, clear, and exact description.

The object of my invention is to provide a new and improved machine for bending wooden shafts or thills for buggies, sulkies, carriages, and other vehicles.

The invention consists in the construction and combination of parts and details, as will be fully set forth and described hereinafter, and pointed out in the claims.

Reference is to be had to the accompanying drawings, forming part of this specification, in which similar letters of reference indicate corresponding parts in all the figures.

Figure 1:
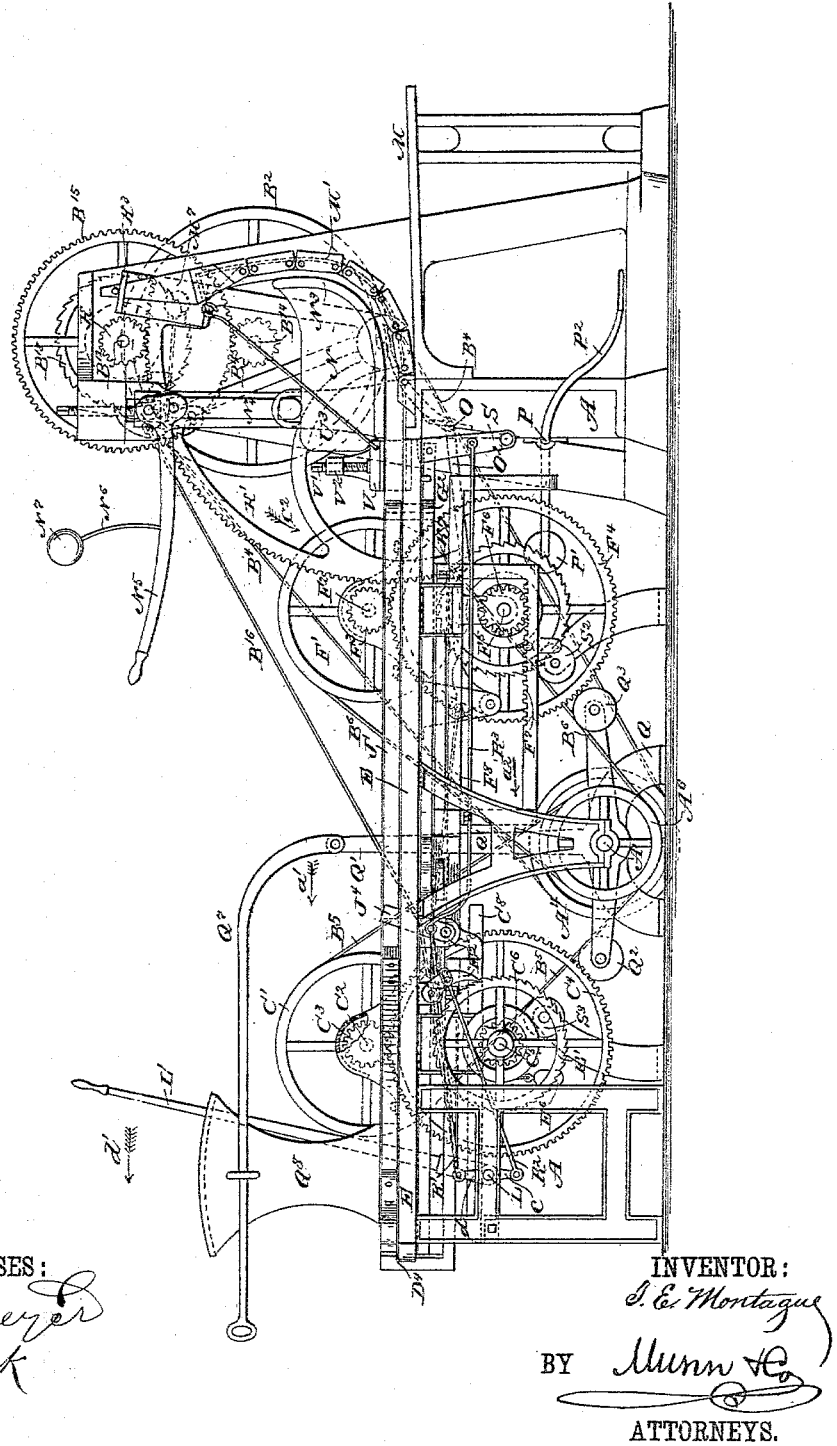
Figure 2:
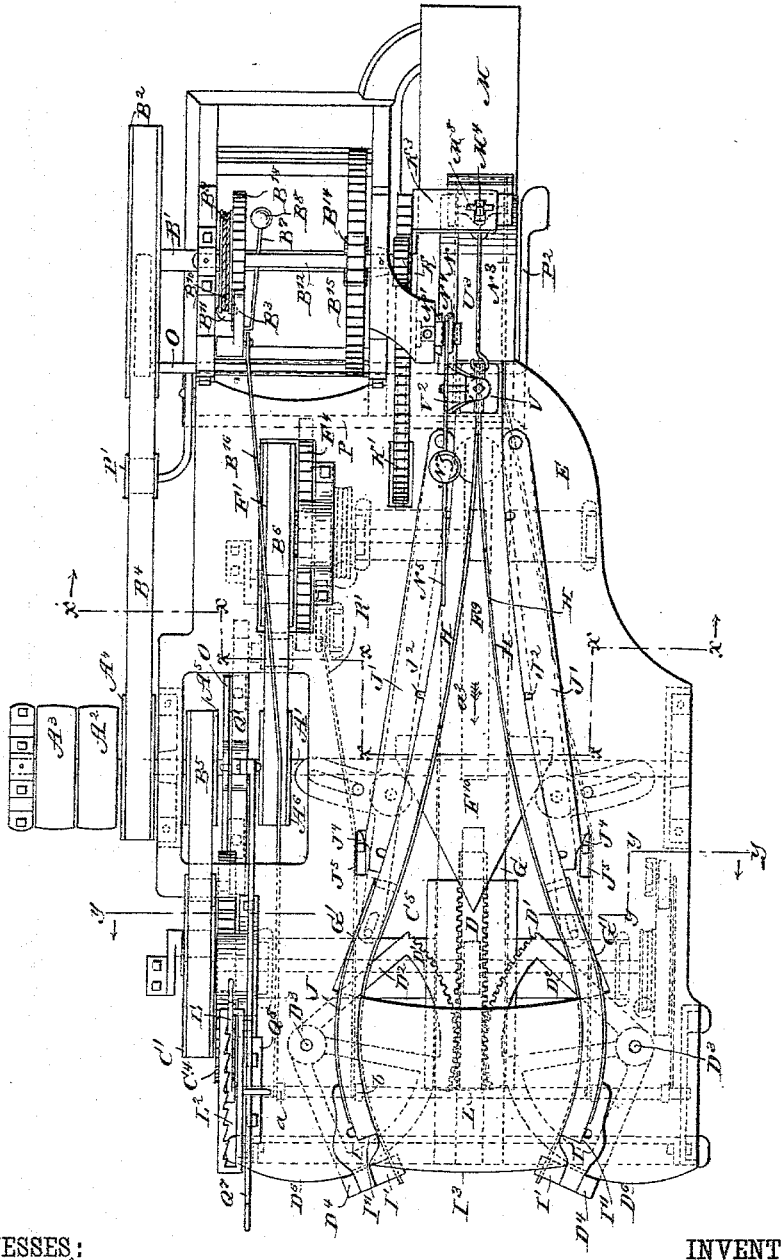
Figure 3:
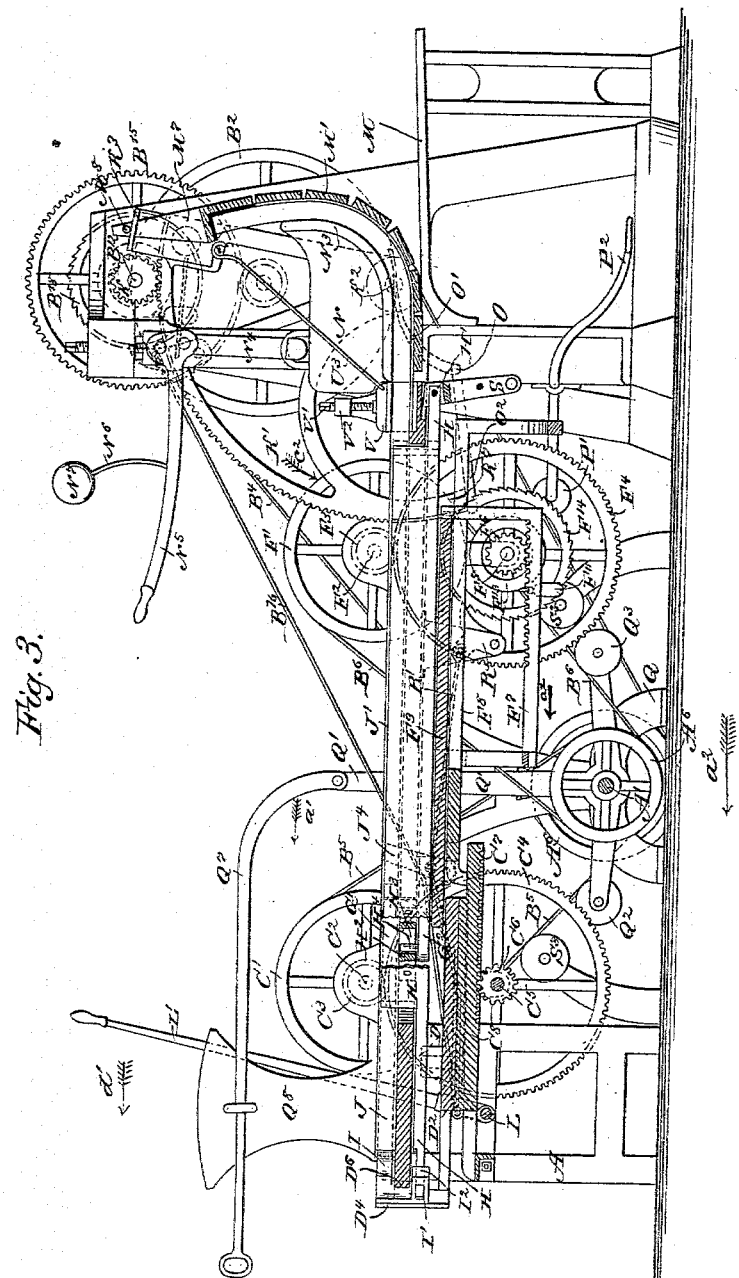
Figure 11:
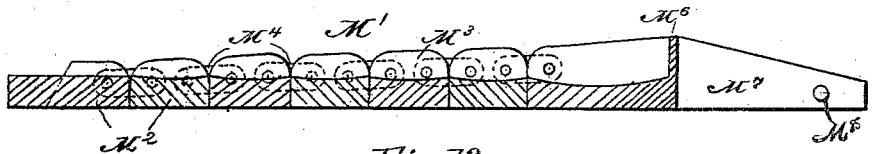
Figure 12:
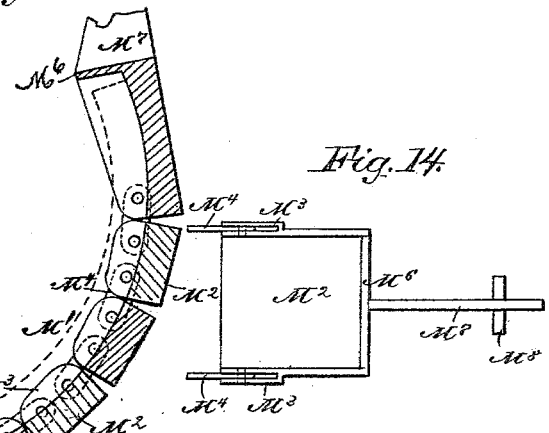
Figure 13:
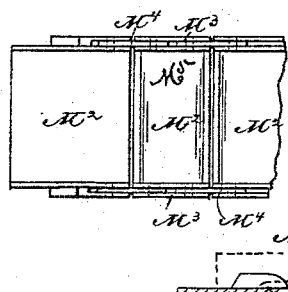
Figure 14:
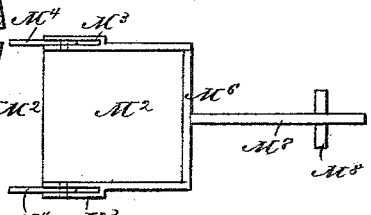
Figure 15:
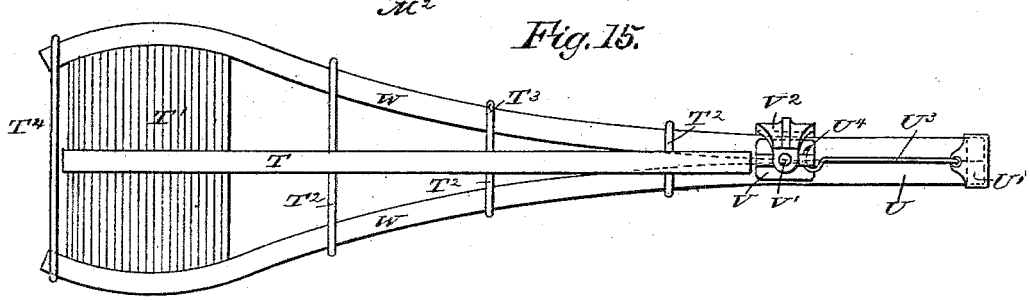
Figure 16:
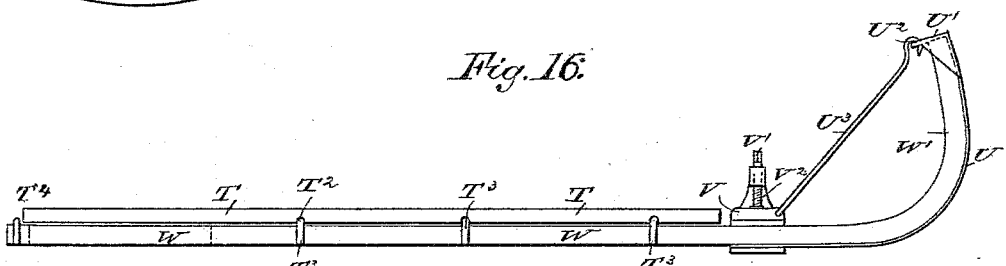

Figure 1 is a longitudinal elevation of my improved shaft-bending machine. Fig. 2 is a plan view of the same. Fig. 3 is a longitudinal sectional elevation of the same. Fig. 4 is a plan view of the same, the top plate being removed and parts being shown in horizontal section. Fig. 5 is an end elevation of the rear part of the machine, parts being in section. Fig. 6 is a cross sectional elevation on the line $x\ x$, Fig. 2. Fig. 7 is a cross sectional elevation on the line $y\ y$, Fig. 2. Fig. 8 is a plan view of the top plate of the machine. Fig. 9 is a side view of the belt-tightener. Fig. 10 is a side view of the standard on which the same is pivoted. Fig. 11 is a detail sectional view of the chain for tightening the end of the shaft. Fig. 12 is a longitudinal sectional view of the same, showing the manner in which it is bent. Fig. 13 is a plan view of one end part of the chain, parts of the chain being broken out. Fig. 14 is a plan view of the swinging end of the chain. Fig. 15 is a plan view of the shafts and the clamps for holding them after having been bent. Fig. 16 is a side view of the same and the clamps for holding them.

A is the frame of the machine, and in said frame a shaft, A', is journaled transversely, on which shaft are mounted the fixed and loose belt-pulleys $A^2\ A^3$ and additional belt-pulleys, $A^4$, $A^5$, and $A^6$, Figs. 2 and 4, over which belt-pulleys $A^4$, $A^5$, and $A^6$ the belts $B^4$, $B^5$, and $B^6$ pass. The belt $B^4$ passes over a belt-pulley, $B^2$, on a shaft, B', having a gear-wheel, $B^{14}$, engaging with a cog-wheel, $B^{15}$, on a shaft, $B^{12}$, carrying a ratchet-wheel, $B^{18}$, with which a pawl, $B^3$, engages, which pawl is connected with a rod, $B^{16}$, and is provided with an arm, $B^7$, on the free end of which a weight, $B^8$, is secured, which weight $B^8$ presses the pawl $B^3$ on the teeth of the ratchet-wheel $B^{18}$. A grooved pulley, $B^9$, is mounted on the shaft $B^{12}$, and on the same a cord, $B^{10}$, is wound, on the free end of which a weight, $B^{11}$, is secured. The other parts operated by the shaft $B^{12}$ will be described hereinafter.

The belt $B^5$ passes over a pulley, C', on a short shaft, $C^2$, suitably mounted on the frame and carrying a pinion, $C^3$, engaging with a cog-wheel, $C^4$, on a transverse shaft, $C^5$, carrying a pinion, $C^6$, engaging with a rack, $C^7$, formed in the bottom edge of a sliding platform, $C^8$, which is guided to slide in the direction of the length of the machine on two track-bars, C C, Fig. 4. On the upper surface of the sliding frame or carriage $C^8$ a double track, D, having the teeth in the side or longitudinal edges, is formed, each side of the rack engaging with a segment-rack, D', formed on half of the curved part of a quadrant-lever, $D^2$, pivoted in the frame A by pivots $D^3$ to swing in the horizontal plane, which levers $D^2$ are provided on the ends projecting beyond the end of the frame with upwardly-projecting lugs $D^4$, having recesses $D^5$ in the inner surfaces, into which recesses segmental projections $D^6$ in the end of the top plate, E, of the machine pass, the radius of the curved projections $D^6$ being equal to the radius of the quadrant-levers $D^2$. On that end of the shaft $C^5$ opposite the one on which the cog-wheel $C^4$ is mounted a ratchet-wheel, E', is mounted, with which a pawl, $E^2$, engages, which is pivoted on the frame of the machine and connected with a rod, $R^2$. A grooved pulley, $E^4$, is mounted on the shaft $C^5$, and on the same a rope, $E^5$, is wound, which rope has a weight, $E^6$, secured to its free end.

The belt $B^6$ passes over a pulley, F', on a shaft, $F^2$, carrying a pinion, $F^3$, engaging with a cog-wheel, $F^4$, on a shaft, $F^5$, carrying a pinion, $F^6$, engaging with a rack, $F^7$, on a sliding plate, $F^8$, guided on two longitudinal bars, $F^9$, in the frame, which sliding plate $F^8$ has a wedge-shaped head, $F^{10}$, the point of which projects toward that end of the machine on which the segmental projections D⁶ are provided.

On the shaft F⁵ a ratchet-wheel, F¹⁴, is mounted, with which a pawl, R, engages, which pawl is connected with a rod, R'. On said shaft F⁵ is also mounted a grooved pulley, F¹³, on which a rope, F¹², is wound and secured, a weight, F¹¹, being secured to the free end of said rope.

In the top plate, E, of the machine a longitudinal V-shaped recess, G, is formed, which is provided in each side, near the wider end, with an offset, G', at which the width of the slot increases. The above-described slide F⁸ slides under the said slot, as is shown in Fig. 2, as does also the slide C⁸. On the under side of the top plate two levers, G², are pivoted, one at each side of the slot, which levers are pivoted at the smaller end of the slot and are adapted to swing toward and from each other. Each lever is provided with an arm, G³, slotted longitudinally and projecting from the outer edge, into the slot of which arm a pin, G⁴, projects from the under side of the top plate, E. On the under side of each lever G² a roller or pulley, G⁵, is pivoted, which pulleys project slightly from the inner edges of the levers G², and are so located that they can be acted upon by the wedge-shaped head F¹⁰ of the sliding plate F⁸.

Two metal strips or bars, H, placed edgewise, are held by a pivot, H', beyond the smaller end of the slot G, and the said strips or bars extend under the top plate, E, to the other end of the machine. They are secured to the inner edges of the blocks H², provided with longitudinal slots H³ and resting on the swinging ends of the levers G², the blocks H² being held on the said swinging ends of the levers by pins H⁴ passed through the slots in the ends of said blocks. Said bars or strips H pass longitudinally through the slot G, and in said slot project slightly above the upper surface of the plate E, but at the wider end of said slot they are provided with an offset, at which the height of said strips decreases. Their ends are secured in arms I', projecting downward from blocks I, resting on the upper surface of the plate E, which arms have lugs I² extending under the curved end edge of the top plate, E, for the purpose of holding the blocks I down on said top plate. The top plate is provided with a segmental section, I³, between the projections D⁶. The lugs D⁴ of the quadrant-levers D² are in contact with the blocks I. The blocks I are provided with notches I² in their inner edges. Metal strips or bars J are secured to the outer edges of the blocks H² and to the inner edges of the blocks I, as shown. Said bars J pass over the top plate, E, whereas the bars or strips H pass under it. A flat bar, J', is pivoted at each side of the recess G, at the smaller end of said recess, said bars being adapted to swing on the top plate, E. Each bar is provided on its inner edge, which is slightly curved, with a series of notches, J², at certain intervals. The outer edge of each bar J' is beveled, as shown at J³, at the swinging end, and adjacent to said bevel J³ at the swinging end of the bar a beveled bolt or latch, J⁴, projects through a suitable slot, J⁵, in the top plate, E, which beveled bolts are each connected with the rods R' and R³, which will be further described hereinafter. On the shaft B¹², previously mentioned, a pinion, K, is mounted, which engages with a large segmental rack, K', mounted to swing on a shaft, K².

In the longitudinal central line of the V-shaped slot G, and beyond the smaller pointed end of said slot, is the platform or table M, on about the same level with the top plate, E, of the machine. On that end of the platform or table M nearest the smaller end of the slot G one end of a chain, M', is secured, which chain is formed of a series of links, M², having upwardly-projecting end flanges, M³, provided with longitudinal grooves in their upper edges, and into the grooves in said flanges the links M⁴ can pass, which are pivoted to the flanges M³, and thus unite the several links M². The links M² are provided in their upper surfaces with longitudinal slightly concaved recesses M⁵.

The thickness of the bottom parts of the links M² decreases from the fixed end of the chain to the free end or end opposite the fixed one. The pivots of the links M⁴ at the fixed end of the chain are below the faces of the links M², on which the shafts rest, and at the free end of the chain are above the said faces, the pivots of the intermediate links being arranged in line with the pivots of the end links, as shown in Fig. 13, so that the length of the inner face of the chain will slightly decrease to the center of the chain and slightly increase from the center to the free end when the chain is curved, as shown in Fig. 12. The link M² at the free end of the chain is provided with an upwardly-projecting flange, M⁶, or crosspiece at its outer end, and from said crosspiece a tongue, M⁷, projects, which is provided with a cross piece or pin, M⁸. The quadrant K' is provided with an arm, K³, having an aperture into which the tongue M⁷ is passed, the cross piece or pin M⁸ being on the top of said arm, as shown in Figs. 2 and 3.

A shoe, N, is mounted to slide vertically on a dovetailed guide, N', on a standard of the frame, and said shoe is provided on its bottom curved edge with an outwardly-projecting flange, N³, extending over the link-chain M'. Said shoe is connected by a link or bar, N⁴, with a lever, N⁵, pivoted on the upright of the machine and provided with an arm, N⁶, carrying a weight, N⁷.

A brake-shaft, O, pivoted transversely in the machine, is provided with an arm, O', at one end, which arm can be pressed against the pulley B² or the belt passed over the same, and on the other end is provided with an arm, O², on which the lower end, K⁷, of the quadrant-rack K' can act. A shaft, P, is pivoted transversely in the machine-frame and is provided at one end with a roller, P', directly below the bottom part of the belt B⁴, and at its other end the said lever is provided with a treadle, P², by means of which the roller P' can be swung up and pressed against the said belt B⁴.

On one side of the machine a standard, Q, is secured to the base, on which the rocking T-lever Q' is pivoted at the intersection of its arms by the shaft A', which lever carries grooved rollers Q² and Q³ on the ends of its bottom arm.

Above and below the shaft A' pins Q⁵ project from said lever into segmental slots Q⁶ in the standard Q for the purpose of checking or limiting the swinging movements of said lever Q'. The belt B⁵ runs on the roller Q², and the belt B⁶ runs on the roller Q³. The upper end of the lever Q' is connected with a rod, Q⁷, guided in the standard Q⁸ of the machine and projecting beyond the end of the top plate of the machine and being provided with a handle.

A shaft, L, is provided with a handle, L', projecting up to a notched slot, L², on the outer side of the standard Q⁸, whereby said handle can be locked in place by engaging one of the notches with the edge of the handle. The rod B¹⁶, connected with the pawl B³ of the ratchet-wheel B¹⁸ is connected with an upwardly-projecting arm, a, on the shaft L. The pawl R is connected by a rod, R', with an arm, b, of the shaft L, and said rod R' is also connected with one of the beveled latches J⁴ projecting upward through the slot in the top plate. A lever, S, pivoted on the machine-frame at the inner end of the platform M, as shown in Fig. 1, is connected by a rod, R³, with an arm, d, of the shaft L and with the other latch J⁴. The pawl E² is connected by a rod, R², with an arm, c, on the shaft L. Additional rollers, S² and S³, are provided, over which the belts B⁶ and B⁵ run.

In Figs. 15 and 16 the clamps for holding the bent shafts are shown. The clamp for holding the flat part consists of a bar, T, on one end of which a flat cross-plate, T', is secured, having its ends rounded to fit against the inner rounded edges of the shafts W, and through said bar T a series of cross rods, T², are passed at suitable distance from each other, which rods T² have their ends T³ bent down to hold on the outer edges of the shafts W, and thus prevent the shafts from spreading. A separate cross-rod, T⁴, is used for holding the ends of the shafts after being bent around the plate T'. The other clamp consists of a flexible bar or plate, U, connected at its lower end with the clamp-bar V, and provided at its upper end with a flange, U', having an aperture for receiving a hook, U², of a rod, U³, provided at its lower end with a hook, U⁴, which can be passed into an aperture in the clamping-block V, pressed upon the shafts by a screw, V', passed through a screw-threaded aperture or eye in the upper end of a clamp, V², on which the two shafts are held near their upwardly-bent ends. In the top plate, E, of the machine a recess, m, is provided at the inner end of the table M for receiving the said clamp V².

The operation is as follows: When the operation begins the metal bars H are about parallel with the longitudinal axis of the machine, and extend centrally above the V-shaped slot G. The thills W are then placed on the table in such a manner that they are each held between the inner side of a bar, H, and the inner edge of one of the bars J' on the upper surface of the top E of the machine. The parts W' of the thills that are to be bent upward project beyond the end of the machine and over the platform or table M. The thills also rest on the blocks H², and their outer edges rest against the inner edges of the bars J, extending over the top plate of the machine. The upper end of the lever Q' is then swung in the direction of the arrow a', Figs. 1 and 2, and causes the roller Q³ to press upward against the belt B⁶, whereby said belt is tightened and revolves the pulley F', whereby the shaft F² is revolved, and by intermediate gearing revolves the shaft F⁵, causing the pinion on said shaft F⁵ to move the rack F⁷ in the direction of the arrow a², Figs. 1, 2, and 3, causing the inclined edges of the wedge-shaped head F¹⁰, which is connected with and operated by the rack F⁷, to move in the direction of said arrow, and causing the said head to act on the rollers G⁵ on the levers G², whereby said levers G² are pressed from each other, and thereby the bars H, secured to the blocks H² on the ends of said levers G², are also moved from each other, as are the thills held between said bars H and the bars J', and the thills are thus pressed against the inner edges of the bars J'. With the shaft F⁵ the ratchet-wheel F¹⁴ revolves, and the pawl R, engaging with the said ratchet-wheel, locks the same in place. At the same time the rope F¹², carrying the weight F¹¹, is wound on the pulley F¹³. When the levers G² have been moved from each other sufficiently, they are held in place by the wedge-shaped head F¹⁰, which in turn is held in place by the rack F⁷, locked in place by being engaged with a pinion, F⁶, which in turn is locked in place by the pawl R, engaging with the ratchet-wheel F¹⁴, mounted rigidly on the same shaft with the pinion. The clamping-bar T is then placed on the thills, the cross-bars passing over them, and the downwardly-projecting end of the bars resting against the outer edges of the thills, the curved ends of the plate T' being between the thills. The lever Q' is now moved in the inverse direction of the arrow a' to cause the pulley Q² to tighten the belt B⁵, whereby the pulley C' on the shaft C² is revolved, and by the intermediate gearing the shaft C⁵ is revolved, whereby the sliding platform C⁸ is moved in the inverse direction of the arrow a², Figs. 3 and 4. The racks on the slide C⁸, engaging with the segmental racks D', swing the levers D² in such a manner as to swing the blocks I toward each other, the blocks being guided on the curved edges of the segmental projections $D^6$ on the end of the top plate, E, and thereby the end parts of the shafts are curved, the ends of the shafts resting against the shoulders $I''$ of the blocks I. As the shaft $C^5$ revolves the ratchet-wheel $E'$ is also revolved and is locked in place by the pawl $E^2$, and the rope $E^5$, to which the weight $E^6$ is attached, is wound on the pulley $E^4$. The shaft $C^5$ and the slide $C^8$, the quadrant-levers $D^2$, and the blocks I are thus locked in place, and cannot be released. The thills W are now bent in the plane of the top plate, E, only, and their ends $W'$ are not bent up or down. The bending of the ends must now be accomplished. The end parts of the thills project over the platform M and rest on the link-chain $M'$, which is extended over said platform. The tongue $M^7$ on the free end of the link-chain is passed through the aperture in the lug $K^3$ of the rack $K'$. The clamp $V^2$ is placed in the recess $m$, the thills passing over said clamp and the plate U. The shoe N is moved downward until its bottom flange rests upon the thills by pressing down the lever $N^5$ until its point connected with the rod $N^4$ is out of line with its pivot, as shown in Fig. 3, in which position the parts are held by the weight $N^7$, thus preventing even the most powerful upward strain from forcing or lifting the shoe N off of the thills. The belt $B^4$ must be tightened, which is accomplished by pressing down on the foot-lever $P^2$, whereby the pulley $P'$ is pressed against said belt $B^4$, and by the intermediate gearing the shaft $B^{12}$ is revolved and the pinion K on said shaft revolves the segmental rack $K'$ in the direction of the arrow $c^2$, Fig. 1, whereby the free end of the link-chain $M'$ is raised, as are also those parts of the thills resting on it, and the thills are pressed against the bottom flange, $N^3$, of the shoe N. The pawl $B^3$, engaging with the ratchet-wheel $B^{18}$, locks the parts in place. As the shaft $B^{12}$ revolves, the pulley $B^9$ is revolved, and the rope $B^{10}$, to which a weight, $B^{11}$, is secured, is wound on the pulley. The segmental rack K continues to revolve in the direction of the arrow $c^2$ until its lower end, $K^7$, strikes the arm $O^2$ of the shaft O, whereby the brake-arm $O'$ is pressed against that part of the belt $B^4$ passed around the pulley $B^2$, whereby the friction produced is so great as to stop the further revolution of the wheel $B^2$. The tension on the wood cannot swing the link-chain $M'$ down and cannot swing the segmental rack in the inverse direction of the arrow $c^2$, as the parts are locked in place by the pawl $B^3$, as mentioned above. The rod $U^3$ is hooked in the clamp and in the end flange, $U'$, of the metal plate U, which metal plate is interposed between the bottom edges of those parts of the thills projecting over the platform M and the link-chain $M'$. The upwardly-bent parts of the thills are thus held securely in place and cannot swing down. and by the clamp $V^2$ the two thills are held firmly together at the beginning of the upwardly-projecting part. The clamping-bar T is then placed on the thills, the cross-bars $T^2$ passing over the thills and their downwardly-projecting ends resting against the outer edges of the thills. The curved ends of the board T rest against the inner surfaces of the thills, and hold them to the desired curve. Then the lever $L'$ is swung in the direction of the arrow $d'$, Figs. 1 and 3, whereby the shaft L is turned in such a manner as to pull on the rods connected with the pawls $E^2$, R, and $B^3$ and disengage them from their ratchet-wheels, thus permitting the weights on the pulleys connected with said ratchet-wheels to descend, thereby revolving the ratchet-wheels, &c., in the inverse direction and bringing the several parts back into the positions they held before the operation began. By turning the shaft L, the rod $R^3$ also swings the lever S in the direction of the arrow $a'$, Fig. 1, whereby the metal bars H are moved in the same direction and the end pieces of the blocks I are moved slightly from the ends of the thills, thus permitting of lifting the thills held together by the clamping-frame, as shown in Figs. 15 and 16, from the top plate of the machine. At the same time that the pawls are being swung from their ratchet-wheels the latches $J^4$ are moved in the direction of the arrow $g'$, Fig. 8, and from the beveled ends $J^3$ of the bars $J'$, thus permitting the said bars $J'$ to swing from each other slightly to permit of removing the bent thills and their clamps very easily. The notches $J^2$ in the inner edges of the bars J serve to receive the ends $T^3$ of the clamping-rods $T^2$ on the bar T.

The several pulleys, wheels, &c., of my machine are provided with spokes for the purpose of making them as light and easy-running as possible.

Thills of greater or less thickness can be bent on my improved machine. The machine operates very rapidly and automatically, with the exception of the adjustment of the tension of the belts, which is easily accomplished with the belt-tightening levers herein described.

The clamp herein shown and described for holding the thills after being bent forms no part of the present invention; but I reserve to myself the right to make a separate application therefor at some future time.

Having thus described my invention, what I claim as new, and desire to secure by Letters Patent, is—

1. In a shaft-bending machine, the combination, with shaft-holding bars pivoted to swing in a horizontal plane, of a slide arranged below the said bars and having a wedge-shaped end engaging depending portions of the said bars, and means for reciprocating the slide, substantially as described, whereby provision is made for turning the said bars on their pivots to spread the same, as and for the purpose set forth.

2. In a shaft-bending machine, the combination, with shaft-holding bars pivoted to swing in a horizontal plane and provided with guide-arms, of a slide arranged below the said bars and having a wedge-shaped end engaging depending portions of the said bars, a rack carried by said slide, a pinion engaging the rack, and means for operating the pinion, substantially as herein shown and described.

3. In a wood-bending machine, the combination, with shaft-holding bars pivoted to swing in a horizontal plane and having flexible ends, of segmental toothed levers engaging the ends of the said bars, a rack engaging the toothed levers, and means for operating the said rack, substantially as herein shown and described.

4. In a shaft-bending machine, the combination, with the pivoted shaft-holding bars having flexible ends, of a slide having a beveled end engaging said bars, pivoted levers for engaging and bending the said flexible ends toward each other, and means for operating said slide and levers, substantially as herein shown and described.

5. In a shaft-bending machine, the combination, with pivoted shaft-holding bars having flexible ends and provided with rollers, of a slide having a beveled end engaging the rollers of the said bars, pivoted segmental levers for engaging and bending the flexible ends of the shaft-holding bars toward each other, and means for operating the said slide and segmental levers, substantially as herein shown and described.

6. In a shaft-bending machine, the combination, with pivoted shaft-holding devices having flexible ends, of a slide for spreading the said devices, pivoted segmental racks, a toothed slide meshing with said racks, and means for operating the said slides, substantially as herein shown and described.

7. In a shaft-bending machine, the combination, with bending devices and independent sets of gearing for operating the said bending devices, of pawls for locking the several sets of gearing in place after they have operated the bending devices, a rock-shaft, and rods connected to said pawls and rock-shaft, substantially as herein shown and described.

8. In a shaft-bending machine, the combination, with shaft-bending devices, independent sets of gearing for operating the said bending devices, pawls for locking the sets of gearing after they have operated the bending devices, a rock-shaft, and rods connected to said pawls and rock-shaft, of a pulley mounted on a shaft of each set of gearing, a cord or rope attached to said pulley, and a weight on the free end of the said cord or rope, substantially as herein shown and described.

9. In a shaft-bending machine, the combination, with two independent sets of gearing, of an armed belt-tightening lever pivoted between the two sets of gearing for tightening the driving-belt of either set of the said gearing, substantially as herein shown and described.

10. In a shaft-bending machine, the combination, with a supporting-frame, levers pivoted on the same, and shaft-bending bars secured to the ends of the said levers, of a slide for spreading the pivoted bars, quadrant-levers pivoted to swing in a horizontal plane, a slide engaging the said quadrant-levers, and two independent sets of gearing, each operating one of the said slides, substantially as herein shown and described.

11. In a shaft-bending machine, the combination, with a frame, of a pair of straight levers pivoted to swing in the horizontal plane, a pair of quadrant-levers pivoted to swing in the horizontal plane, shaft-bending bars connected with the ends of the straight levers, slides for operating the above-mentioned levers, and gearing for operating the said slides, substantially as herein shown and described.

12. In a shaft-bending machine, the combination, with a frame, of a pair of straight levers pivoted to swing in the horizontal plane toward and from each other, blocks held by pins on the ends of said levers, quadrant-levers pivoted to swing in the horizontal plane, shaft-bending bars connected with the blocks on the straight levers, slides for operating the said levers, and gearing for operating the slides, substantially as herein shown and described.

13. In a shaft-bending machine, the combination, with a pair of straight levers pivoted to swing in the horizontal plane toward and from each other and having slotted arms through which guide-pins pass, of a slide having a wedge-shaped head acting on rollers on said levers, quadrant-levers pivoted to swing in the horizontal plane, shaft-bending bars connected with the straight levers, a slide engaging with the said quadrant-levers, and means for operating the said slides, substantially as herein shown and described.

14. In a shaft-bending machine, the combination, with a frame and a top plate having a longitudinal V-shaped slot, of levers pivoted below the top plate to swing toward and from each other in the horizontal plane, quadrant-levers pivoted below the top plate to swing in the horizontal plane, and shaft-bending bars connected with the straight levers, which bars throughout part of their length project through the longitudinal slot in the top plate, the remaining parts of the bars being below the top plate, substantially as herein shown and described.

15. In a shaft-bending machine, the combination, with a frame, of the top plate having a longitudinal V-shaped slot, the levers $G^2$, pivoted below the top plate to swing toward and from each other in the horizontal plane, the blocks $H^2$ on the ends of the levers $G^2$, the quadrant-levers $D^2$, pivoted to swing in the horizontal plane, the shaft-bending bars H, secured to the blocks $H^2$ and extending under the top plate, and the bars J, secured to the blocks $H^2$, passed over the top plate and connected with block I, operated on by the ends of the quadrant-levers, substantially as herein shown and described.

16. In a shaft-bending machine, the combination, with a frame, of the top plate having a longitudinal V-shaped slot and the segmental projections $D^6$ on one end, the quadrant-levers $D^2$, pivoted to swing in the horizontal plane below the top plate and having guide-arms running on the segmental edges of the projections $D^6$, the levers $G^2$, pivoted below the top plate to swing toward and from each other, and the shaft-bending bars H, connected with the levers $G^2$ and with the block I, operated on by the quadrant-levers $D^2$, substantially as herein shown and described.

17. In a shaft-bending machine, the combination, with a frame, of the top plate, levers pivoted on the under side of the same to swing toward and from each other, shaft-bending bars connected with said levers, gearing for separating the levers, the quadrant-levers $D^2$, having racks formed on their curved edges, a slide, $C^5$, having a double rack, D, formed on its upper side and the rack $C^7$ on its under side, and gearing operating a pinion engaging with the rack on the under side of the slide, by which above-mentioned quadrant-levers the shaft-bending bars are also acted upon, substantially as herein shown and described.

18. In a shaft-bending machine, the combination, with a frame and the top plate having a longitudinal V-shaped slot, of the levers $G^2$, pivoted below the top plate, the quadrant-levers $D^2$, intermediate mechanism between the levers $G^2$ and the quadrant-levers $D^2$, the bars H, connected with the blocks I, the bars J', pivoted on the upper surface of the top plate, and gearing for operating the levers $G^2$ and the quadrant-levers $D^2$, substantially as herein shown and described.

19. In a shaft-bending machine, the combination, with a frame and a top plate having a longitudinal V-shaped slot, of the levers $G^2$, pivoted on the under side of the top plate, the quadrant-levers $D^2$, the bars H, connected with the levers $G^2$ and the blocks I, acted upon by the quadrant-levers, the levers J', pivoted on the upper surface of the top plate and having notches $J^2$ in their inner edges, slides for operating the levers $G^2$ and the quadrant-levers $D^2$, and gearing for operating the said slides, substantially as herein shown and described.

20. In a shaft-bending machine, the combination, with a frame and a top plate having a longitudinal V-shaped slot, of the shaft-bending bars H, levers to which said bars are connected, gearing for operating said levers, the bars J', pivoted on the upper surface of the top plate at the side of the V-shaped slot, which bars have bevels $J^3$ on the outer edges at the swinging ends, and the latches $J^4$, substantially as herein shown and described.

21. In a shaft-bending machine, the combination, with a frame and a top plate having a longitudinal V-shaped slot, of the shaft-bending bars H, levers to which said bars are connected, gearing for operating said levers, the bars J', pivoted on the upper surface of the top plate at the sides of the V-shaped slot, which bars have bevels $J^3$ on their outer edges at the swinging ends, the latches $J^4$, rods connected with said latches, and a shaft having arms to which said rods are pivoted, substantially as herein shown and described.

22. In a shaft-bending machine, the combination, with a supporting-frame, shaft-bending devices, and bars J', having bevels $J^3$ on the said frame, of independent sets of gearing for operating the said bending devices, a ratchet-wheel in each of the gearings, pawls engaging the ratchet-wheels, a rock-shaft having arms, latches projecting through the top of the frame and engaging the beveled ends of the bars J', and rods connected to the pawls, latches, and rock-shaft, substantially as herein shown and described.

23. In a shaft-bending machine, the combination, with a frame and top plate having a longitudinal V-shaped slot, of levers pivoted in said frame, shaft-bending bars H, connected with said levers, the pivoted lever S, connected with said bars H, the connecting-rod $R^3$, the shaft L, having an arm with which said rod is connected, gearing for operating the levers with which the shaft-bending bars H are connected, ratchet-wheels and pawls for locking said gearing, and connecting-rods connected with the pawls, said connecting-rods being connected with the shaft L, substantially as herein shown and described.

24. In a shaft-bending machine, the combination, with a frame, of two sets of gearing operating shaft-bending devices, separate belts for driving the two sets of gearing, the standard Q, having the opposite segmental slots $Q^6$, the T-lever Q', pivoted on the standard Q and having pins $Q^5$ passed into the slots $Q^6$, and the pulleys $Q^2$ and $Q^3$ on the ends of the lower arms of the lever Q', which pulleys $Q^2$ and $Q^3$ are in proximity to the two driving-belts $B^5$ and $B^6$ for driving the two sets of gearing, substantially as herein shown and described.

25. In a shaft-bending machine, the combination, with a segmental rack and gearing for operating the same, of a bending-chain having one end connected to said rack end, a vertical movable shoe, N, above the fixed part of the chain, and means for raising and lowering and locking the shoe in position, substantially as herein shown and described.

26. In a shaft-bending machine, the combination, with the supporting-frame, a segmental rack, gearing for operating the said rack, and a bending-chain having one end connected to said rack, of the shoe N, fitted to slide on the frame, the lever $N^5$, pivoted to the frame above the shoe, and the bar $N^4$, pivoted to the said lever and shoe, substantially as herein shown and described.

27. In a shaft-bending machine, the combination, with the segmental rack, gearing for operating the same, a shaft-bending chain having one end connected with one end of the segmental rack, the shoe N, the pivoted lever $N^5$, and the bar $N^4$, connecting said lever with the shoe N, the arm $N^6$ on the lever $N^5$, and the weight $N^7$ on the end of said arm, substantially as herein shown and described.

28. In a shaft-bending machine, the combination, with a segmental rack, of gearing for operating the same, belts and pulleys for operating the gearing, the shaft-bending chain connected with one end of the segmental rack, the shaft O, having an arm, $O^2$, below one end of the segmental rack, and the other arm, O′, which acts as a brake-arm at the belt of the driving-pulley, substantially as herein shown and described.

29. In a shaft-bending machine, the combination, with a frame, of the top plate having the recess $m$, the clamp $V^2$, placed in the said recess, the shaft-bending chain M′, the segmental rack K′, having one end connected with said chain, and gearing for operating said segmental rack, substantially as herein shown and described.

30. In a shaft-bending machine, the combination, with the frame A E M, of the segmental rack K, having the arm $K^3$, gearing for operating the rack, and the bending-chain M′, having one end secured to the table M and its other end to the arm $K^3$ of the segmental rack, substantially as herein shown and described.

31. The shaft-bending chain M′, formed of a series of links having upwardly-projecting end flanges, $M^3$, provided with longitudinal grooves in their upper edges and connected by links pivoted in said grooved flanges, substantially as herein shown and described.

32. The shaft-bending chain M′, formed of a series of links, $M^2$, having flanges $M^3$, and united by a series of links, $M^4$, and having the pivots of the links $M^4$ at the fixed end of the chain below the line of the faces of the links $M^2$ and at the free end above said face, the intermediate pivots being correspondingly arranged, substantially as shown and described.

THOS. E. MONTAGUE.

Witnesses:
COLIN MACDOUGALL,
ERNEST W. MCINTYRE.